United States Patent
Hockaday (10) Patent No.: US 6,194,095 B1
(45) Date of Patent: Feb. 27, 2001

(54) NON-BIPOLAR FUEL CELL STACK CONFIGURATION

(76) Inventor: Robert G. Hockaday, 127 Eastgate, Los Alamos, NM (US) 87544

( * ) Notice: Subject to any disclaimer, the term of this patent is extended or adjusted under 35 U.S.C. 154(b) by 0 days.

(21) Appl. No.: 09/210,792

(22) Filed: Dec. 15, 1998

(51) Int. Cl.$^7$ ................................................ H01M 8/04
(52) U.S. Cl. ............................................. 429/34; 429/39
(58) Field of Search ............................. 429/34–39, 127; 427/115

(56) References Cited

U.S. PATENT DOCUMENTS

| | | |
|---|---|---|
| 4,138,510 | 2/1979 | Koziol et al. . |
| 4,243,508 | 1/1981 | Dankese . |
| 4,252,868 | 2/1981 | Bohm et al. . |
| 4,421,579 | 12/1983 | Covitch et al. . |
| 4,623,415 | 11/1986 | Kahara et al. . |
| 4,661,434 | 4/1987 | Ueno et al. . |
| 4,666,579 | 5/1987 | Beaver et al. . |
| 4,673,624 | 6/1987 | Hockaday . |
| 4,769,297 | 9/1988 | Reiser et al. . |
| 4,793,910 | 12/1988 | Smotkin et al. . |
| 4,804,449 | 2/1989 | Sweeney . |
| 4,818,637 | 4/1989 | Molter et al. . |
| 4,824,741 | 4/1989 | Kunz . |
| 4,826,554 | 5/1989 | McIntyre . |
| 4,865,925 | 9/1989 | Ludwig et al. . |
| 4,931,168 | 6/1990 | Watanabe et al. . |

(List continued on next page.)

FOREIGN PATENT DOCUMENTS

| | | |
|---|---|---|
| 0 239 169 | 9/1987 | (EP) . |
| 874283 | 8/1961 | (GB) . |
| 21 39 110 | 11/1984 | (GB) . |
| 2 268 619 | 1/1994 | (GB) . |
| 60-33284 | 2/1985 | (JP) . |

OTHER PUBLICATIONS

Cong Pu et al., "A Methanol Impermeable Proton Conducting Electrolyte System," J. Electrochem. Soc., vol. 142, Jul. 1995.

Pyun et al., "Investigation of the hydrogen evolution reaction at a 10wt% palladium–dispersed carbon electrode using electrochemical impedance spectroscopy," J. App.Electrochemistry, pp. 953–958, 1996. (No Month).

P. Hasler & T. Allendinger, "A Novel Pd–Ag Membrane Anode for Alkaline Fuel Cells Suitable for co2–Containing Hydrogen," J. Power Sources, pp. 93–103, 1993. (No Month).

L.Blomen & M. Mugerwa, "Fuel Cell Systems, " Plenum Press, New York and London, pp. 68–69, 1993. (No Month).

V. Bloomfield, J. Klelland and D. Bloomfield, " Fuel Cells for Space Marin and Defense Applications," 1992 Fuel Cells Seminar, Tucson, Arizona, pp. 387–390, Nov. 29–Dec. 2, 1992.

C. Derouin, T. Springer, F. Uribe, J. Valerio, M. Wilson, T. Zawodzinski and S. Gottesfeld, "Recent Achievemants in Polymer Electrolyte Fuel cell R&D," 1992 Fuel Cells Seminar, Tucson, Arizona, pp. 615–618, Nov. 29–Dec. 2, 1992.

(List continued on next page.)

*Primary Examiner*—Stephen Kalafut
*Assistant Examiner*—Susy Tsang
(74) *Attorney, Agent, or Firm*—James Creighton Wray; Meera P. Narasimhan (57) ABSTRACT

A non-bipolar fuel cell stack configuration where non-bipolar fuel cell arrays, manufactured on reel-to-reel sheets of porous plastic substrate material, are electronically connected in parallel with air and/or oxidizing gas flowing between the arrays. Separator plates of conventional type bipolar fuel cell stacks are eliminated in this approach and many of the electrical contact problems associated with conventional fuel cell stack are overcome. The present invention enables large power fuel cells, with relatively low total mass, to be readily manufactured at low cost.

10 Claims, 11 Drawing Sheets

U.S. PATENT DOCUMENTS

| | | |
|---|---|---|
| 5,084,144 | 1/1992 | Reddy et al. . |
| 5,108,849 | 4/1992 | Watkins et al. . . . |
| 5,173,166 | 12/1992 | Tomantschger et al. . |
| 5,187,025 | 2/1993 | Kelland et al. . |
| 5,234,777 | 8/1993 | Wilson . |
| 5,240,786 | 8/1993 | Ong et al. . |
| 5,242,764 | 9/1993 | Dhar . |
| 5,252,410 | 10/1993 | Wilkinson et al. . |
| 5,262,250 | 11/1993 | Watanabe . |
| 5,264,299 | 11/1993 | Krasij et al. . |
| 5,266,421 | 11/1993 | Townsend et al. . |
| 5,290,323 | 3/1994 | Okuyama et al. . |
| 5,316,871 | 5/1994 | Swathirajan et al. . |
| 5,364,711 | 11/1994 | Yamada et al. . |
| 5,432,023 | 7/1995 | Yamada et al. . |
| 5,453,331 | 9/1995 | Bloom et al. . |
| 5,472,799 | 12/1995 | Watanabe . |
| 5,482,568 | 1/1996 | Hockaday . |
| 5,631,099 | 5/1997 | Hockaday . |
| 5,759,712 | 6/1998 | Hockaday . |

OTHER PUBLICATIONS

Y. Fang and J. Leddy, "Surface Diffusion in Microstructured, Ion–Exchange Matrices: Nafion/Nuetron Track Etched Polycarbonate Membrane Composits," Jouranl of Physical Chemistry, vol. 99, pp. 6064–6073, 1995. (No Month).

B. Gupta and G. Scherer, "Proton Exchange Membranes by Radiation Induced Graft Copolymerizationof Monomers into Teflon–FEP Films," Chimia 48, pp. 127–137, 1994. (No Month).

S. Narayanan, E. Vomos, H. Frank, S. Surampudi and G. Halpert, "Electrochemical Characterizations of Carbon–Supported Pt, Pt–Sn, Pt–Ru Electrodes and the Oxidization of Methanol and Formaldehyde," 1992 Fuel Cells Seminar, Tucson, Arizona, pp. 233–236, No. 29–Dec. 2, 1992.

M. Riezeman, "The Search for Better Batteries," IEEE Spectrum, pp. 51–56, May, 1995.

M. Rota, H.P. Brack, F.N. Büchi, B. Gupta, O. Haas and G. C. Scherer, "Membrane Development of PEFC at PSI," Abstracts of Papers, 187th Meeting of the Electrochemical Society, Reno, Nevada, 1995. (No Month).

S. Surampudi, S.R. Narayanan, E. Vamos, H. Frank, G. Halpert, A. LaConti, J. Kosek, G.K. Surya Prakash and G.A. Olah, "Advances in Direct Oxidation Fuel Cells," Space Electrochemical Research and Technology Proceedings, NASA Lewis Research Center, Cleveland, Ohio, Apr. 14–15, pp. 181–191, 1993.

W. Vielstich, translated by D. Ives, "Fuel Cells," Wiley–Interscience, London, New York, Sydney, Toronto, 1970. (No Month).

W. Vielstich, A. Kuver, M. Krausa, A. Cesar Ferreira, K. Petrov and S. Srinivasan, "Proton Exchange Membrane Fuel Cells Using Gas–Fed Methanol," symposium on Batteries and Fuel Cells for Stationary and Electric Vehicle Applications, Honolulu, Hawaii, pp. 268–280, 1993. (No Month).

Abbott et al., "Manipulation of the Wettability of Surfaces on the 0.1 to 1 Micrometer Scale Through Micromachining and Molecular Self–Assembly," Science, vol. 257, pp. 1380–1382, Sep. 4, 1992.

J.S Batzold, "Thin Film Fuel Cell Electrodes," in *From Electrocatalysts to Fuel Cells*, ed. By G. Sandstede (University of Washington Press, Seattle)), pp. 224–229, Jun. 8, 1972.

Boris Daniel Cahan, "The Mechanism of Electrodic Reactions of Porous Surfaces," Ph.D. Dissertation, University of Pennsylvania, 1968. (No month).

Robert Hockady, "Development and Modeling of the Homoporous Electrode Fuel Cell," Masters Thesis, New Mexico State University, Dec. 1984.

J. Joyce and J. Leddy, "Composite Ion Exchange Membranes: Microstructure and Mass Transport," abstract of an oral presentation, Journal of Electrochemical Society, vol. 135, No. 3, p. 139 C, Mar., 1988.

P.D. Naylor et al., "A Novel Anode System for Direct Methanol Fuel Cell," 1992 fuel Cell Seminar, Tucson, Arizona Nov. 19–Dec. 2, 1992, pp. 575–578.

S. Sarangapani et al., "Advanced Corrosion–Resistant Coatings for Fuel Cell Application," 1992 Fuel Cell Seminar, Tucson, Arizona Nov. 29–Dec. 2, 1992, pp. 167–170.

S.H. Srinivasan et al., "Fundamental Equations of Electrochemical Kinetics at Porous Gas–Diffusion Electrodes," The Journal of Chemical Physics, vol. 46, No. 8, Apr. 15, 1967, pp. 3108–3122.

NON-BIPOLAR FUEL CELL STACK CONFIGURATION

BACKGROUND OF THE INVENTION

This invention relates generally to non-bipolar fuel cells and more specifically to high energy fuel cell stacks that deliver from tens of watts to megawatts of power.

Figure 1:
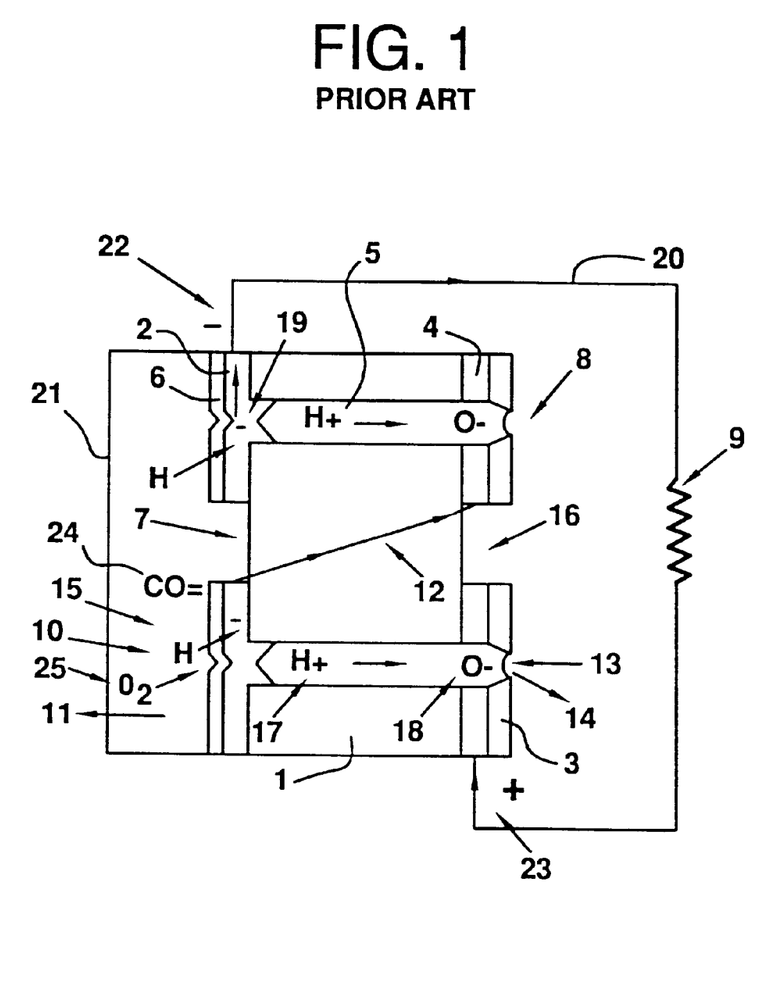
FIG. 1 shows a cross sectional view of a prior art nonbipolar fuel cell.

The fundamental components of a prior art non-bipolar fuel cell array are shown in the schematic cross-sectional view of FIG. 1. The basic components are the porous dielectric substrate 1, the electrolyte 6, the fuel electrode 2, the oxidizer electrode 3, the cell breaks 7 and 16, the cell interconnects 12, the external electrical circuit 20, and the electrical load 9. The fuel cell operates with the fuel 10 (such as hydrogen or methanol) dissolving in an electrolyte 6. The dissolved fuel 10 catalytically breaks down into monatomic hydrogen 15 on the catalyzed fuel electrode 2. The monatomic hydrogen 15 travels through the fuel electrode 2, giving up an electron 19 to the electrode 2, and forms a hydrogen ion 17 in the proton conductive electrolyte 5. The electron 19 travels through the cell interconnects 12 to the adjacent cell oxidizer electrode 3, which is formed over conduction electrode 4. The hydrogen ion 17 travels though the conductive electrolyte 5 to the oxidizer electrode 3. At the negative output terminal 22 of the array, electrons 19 flow though the electrical circuit 20 through an electrical load 9 and to the positive terminal of the array 23. The array voltage is determined by the number of cells in the array connected in series. Each of the cells are electrically separated from the adjacent cells by dielectric occupied regions called cell breaks 7 and 16. Adjacent cells are electrically connected by electron conductive vias or cell interconnections 12. At the oxidizer electrode 3 and 4, air 8 is catalytically reacted with the surface of the catalytic electrode 3 to form surface oxygen 13, or oxygen ions 18 in the electrolyte. The oxygen electrode is made of layers of conductive metal films 4 and catalytic electrodes 3. The oxygen ions 18 then receive the electrons from the electrodes 3 and form water 14 (a by-product) at the oxygen electrode 3. On the fuel electrode 2 the fuel is gradually catalytically stripped of it's hydrogen 15 to leave carbon monoxide 24 on the surface of the electrode. The carbon monoxide 24 is oxidized to carbon dioxide 11 by taking the oxygen from water 10 in the fuel or by oxygen 25 which is diffused through the fuel enclosure wall 21. The carbon dioxide 11 by-product diffuses out though the fuel enclosure wall 21 or through the cell break regions 7 and 16. The water 14 by-product diffuses out from the oxygen electrode 3 to the surroundings. This particular example shows the fuel electrode 2 being pore free. This pore free electrode 2 can block fuel diffusion such as methanol 10 while passing monatomic hydrogen 15 to allow the fuel cell to efficiently utilize the methanol fuel. It may also add diatomic hydrogen diffusion impedance while preferentially having a low impedance to monatomic hydrogen, which has been catalyzed. Thus the pore free electrode 2 can also improve the performance of hydrogen fueled fuel cells.

By utilizing liquid methanol and water fuel, this type fuel cell packs more energy in a smaller space than conventional rechargeable batteries. The methanol fuel has effectively 5 to 13 Whr per cubic inch (20% to 50% efficiency) energy density. This is 3 to 9 times the energy density of today's best nickel cadmium batteries, and 40 to 120 times that of standard cellular phone battery packs. Also, these micro-fuel cells are lighter than conventional rechargeable batteries. The methanol fuel has effectively 1200 to 3000 Whr per kg energy per unit mass (20% to 50% efficiency). This is 2 to 5 times the 600 Whr per kg quoted for the latest rechargeable lithium ion batteries (Science News, Mar. 25, 1995). Various patents, such as U.S. Pat. No. 5,631,099, U.S. Pat. No. 5,759,712, U.S. Pat. No. 5,364,711, and U.S. Pat. No. 5,432,023 describe such non-bipolar fuel cells that run on hydrogen, hydrocarbon fuels, and oxygen. However, they do not describe how to assemble these fuel cells into larger parallel fuel cell stacks, which is the primary objective of this patent.

Our earlier U.S. Pat. Nos. 4,673,624 and 5,631,099 describe how to form non-bipolar stacks on insulator substrates. The method of stacking the fuel cells along a common fuel and electrical power connection is also mentioned in our U.S. Pat. No. 5,759,712. The present invention is intended to extend the micro-fuel cell principles set forth in these earlier patents and to show how these fuel cells are configurable into a stack to provide higher power capacity systems with air flow cooling. The present invention also shows how water is used along with air flow cooling to provide a heat and water exchanger.

SUMMARY OF THE INVENTION

The primary objective of the present invention is to form modular power units that may be connected in parallel to deliver power in large quantity from tens of Watts to megawatts. These larger configurations of micro-fuel cells use active circulation and a variety of compatible reactants to achieve the high power outputs needed in many modern applications. An example of applications that realize a significant advantage from such power systems include, but are not limited to, household and building electrical power generators, portable electrical power generators, large power tools, utility power generators, telecommunications electrical power, and vehicle power. The principal advantages of using a fuel cells in these applications are that (1) the fuel cell realizes roughly twice the efficiency of the conventional heat engines, (2) they are quiet in operation, and (3) they are far less polluting.

The fuel cells of this invention may be formed on plastic sheets which make the manufacturing process suitable for large volume applications. Also, a critical component found in conventional bipolar fuel cell stacks, the electrically conductive separator plate, is completely eliminated in this approach. It is estimated that by eliminating this component from the fuel cell stack, a reduction in cost of from 10% to 20% is realized. As a result, these fuel cells have advantages over conventional fuel cell designs because of reduced mass, fewer components, and lower manufacturing and assembly costs.

This patent covers two embodiments for the packaging techniques of fuel cells for higher power applications. One preferred embodiment is a sealed assembly of multiple parallel arrays. A second preferred embodiment is a modular assembly of multiple parallel arrays. In the sealed assembly, the desired number of arrays are built up and sealed during the manufacturing phase. In the modular approach, the fuel cell arrays are assembled into fuel and air circulation frames to form modules that make connections for fuel, air, and electrical contact with a built-in bus structure. In the modular approach, the bus permits multiple modules to be connected in parallel by the enduser in as few as one module up to a large number of modules, depending on the application. This allows fuel cell energy systems to be sized appropriately to the application by simply adding or removing modules. The fuel cell modules may be installed or removed while the system is running, resulting in minimum down time for maintenance. They may also be adapted to offer a means for self-cleaning the cells, for purging the fuel lines, and for a "fail-safe" power shut down if unfavorable conditions exist.

These and further and other objects and features of the invention are apparent in the disclosure, which includes the above and ongoing written specification, with the claims and the drawings.

DETAILED DESCRIPTION OF THE PREFERRED EMBODIMENTS

Figure 2A:
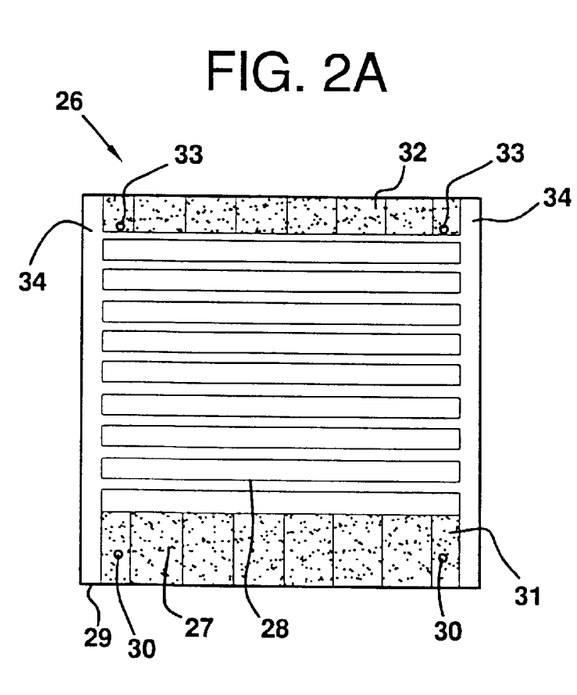
FIGS. 2A, 2B and 2C are typical layouts of the non-bipolar fuel cell array showing the air electrode side, a side view, and the fuel electrode side of the array.
Figures 2B, 2C:
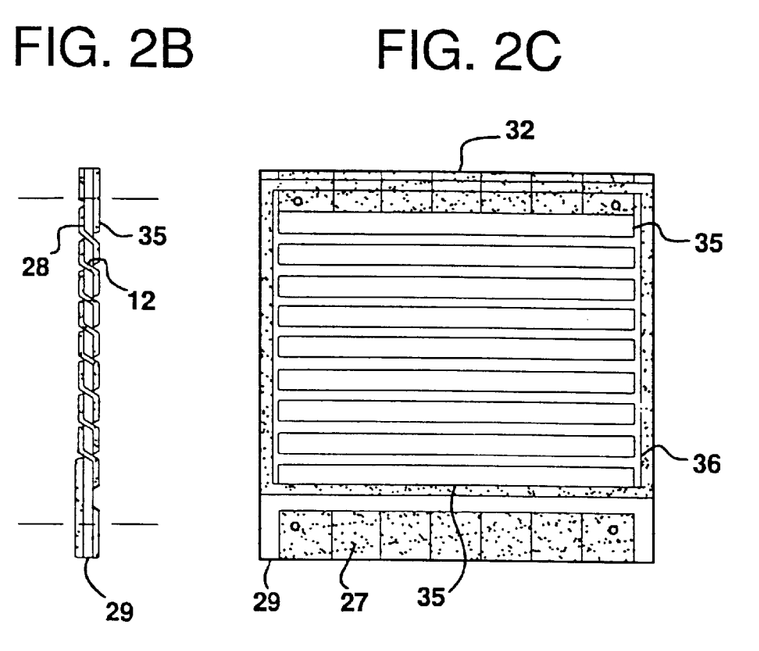

FIGS. 2A, 2B and 2C illustrate the non-bipolar micro-fuel cell array 26 that is central to this invention and described in more detail in U.S. Pat. Nos. 4,673,624, 5,631,099, and 5,759,712. FIG. 2A shows the air side of the non-bipolar micro-fuel cell array. The air contact electrode 27 and air electrodes 28 are deposited on one side of the porous dielectric substrate 29. The porous dielectric substrate 29 is made of dielectric materials such as polyimide or polyester plastics. The deposited electrodes 27 and 28 may be formed in a variety of methods as given in U.S. Pat. Nos. 4,673,624, 5,631,099, and 5,759,712. These electrodes, which represent small individual fuel cells, are connected in parallel with circuit traces along both edges of the array, or through the membrane 29 via interconnections 12, as shown in FIG. 2B. Bolt holes 30 and 33 for holding the assembly together are formed in the porous plastic 29. Also, an electrical diode 31 is formed on the air side of the fuel cell array 26 to prevent reverse current flow through the array. The porous plastic substrate 29 is made to be electrically conductive through the fuel contact electrode 32 and the air electrical contact electrode 27. Both fuel and negative electrical compression connections are provided for through holes 33, with a thin sealant gasket 36 in the porous dielectric substrate 29, while positive electrical compression connections are provided through holes 30.

FIG. 2B is a side view of the non-bipolar fuel cell array. The porous dielectric substrate 29 is a thin membrane typically 5 to 200 microns thick. An electrolyte impregnates the porous dielectric substrate 29 in between the fuel cell's air electrodes 28 and fuel electrodes 35, such as described in U.S. Pat. Nos. 4,673,624, 5,631,099, and 5,759,712.

FIG. 2C shows the fuel side of the non-bipolar micro-fuel cell array. The fuel electrodes 35 are deposited on the porous dielectric substrate 29 in the same manner as the air electrodes above. As with the air electrodes, the fuel electrodes 35 are connected in parallel with circuit traces along both edges of the array (not shown in this view). A gasket seal surface 36, coated with a material such as a polyester epoxy, is added as a border around the fuel electrodes 35. The fuel contact electrode 32 makes contact to the last fuel electrode 35 in the array inside the gasket seal. The air contact electrode 27 is shown separated from the fuel electrode 35 in the array on the outside of the gasket. These larger configurations of micro-fuel cells use active circulation and a variety of compatible reactants including, but not limited to, methanol, ethanol, hydrogen, reformate hydrogen, air, fluorine, chlorine, bromine, iodine, and oxygen to achieve the high power outputs needed in many modern applications.

Figure 3:
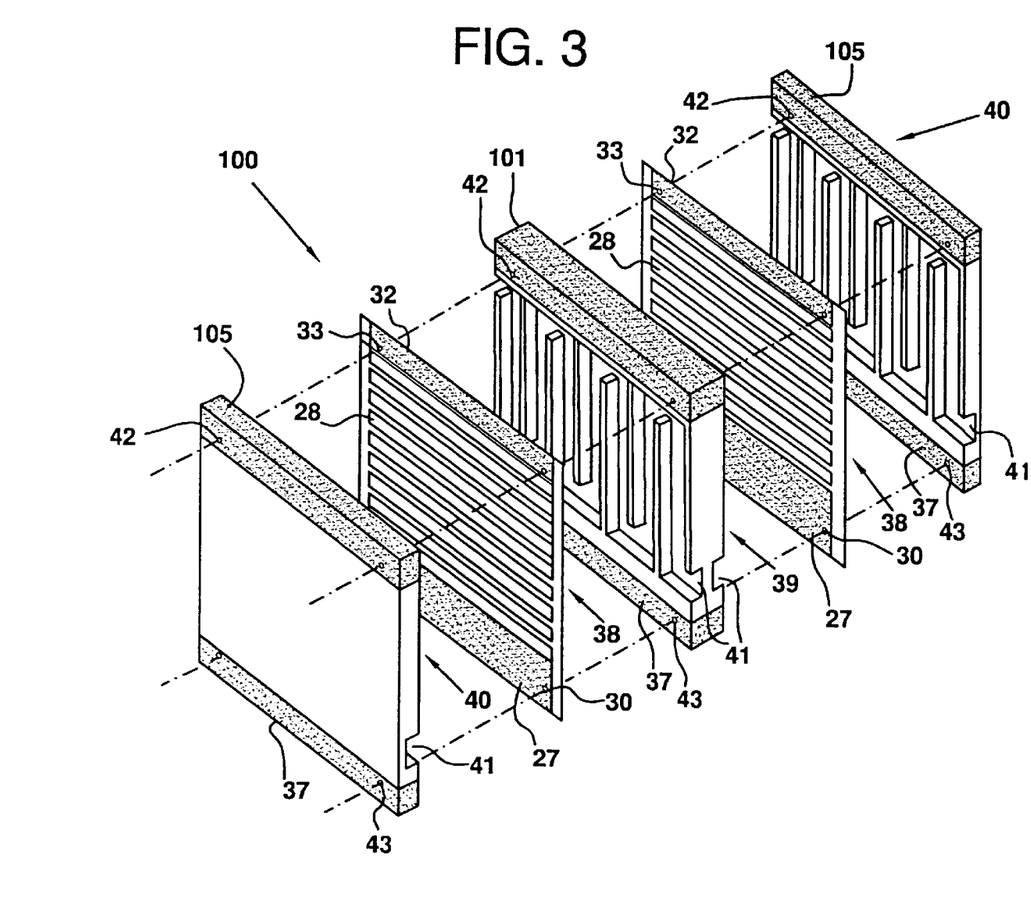
FIG. 3 shows an exploded view of the sealed fuel cell stack embodiment.

FIG. 3 shows an exploded view for one embodiment of a non-bipolar fuel cell stack 100 configuration. The fuel cell stack 100, as shown, is comprised of two fuel cell assemblies 38, each made up of two fuel cell arrays 26 (as shown in FIGS. 2A, 2B and 2C), one central air flow manifold 39, and two end plate air flow manifolds 40. Larger stacks may be formed by inserting additional fuel cell assemblies 38 and central air flow manifolds 39 as desired. As shown, the air flow manifold 39 has air channels 41 to provide heat and water exchange to the air electrode side of the fuel cell assemblies 38. The fuel bolt holes 33 and 42, which are shown lined up, are used to provide a means for fueling, for negative electrical connections, and as a mechanical support by compressing the negative contact electrodes 32, 101 and 105 together on the fuel cell assemblies 38 and air flow manifolds 39, respectively. In a similar manner, the air electrode bolt holes 30 and 43 provide both positive electrical connections and mechanical support by compressing the positive contact electrodes 27 and 37 together on the fuel cell assemblies 38 and air flow manifolds 39, respectively.

Figure 4:
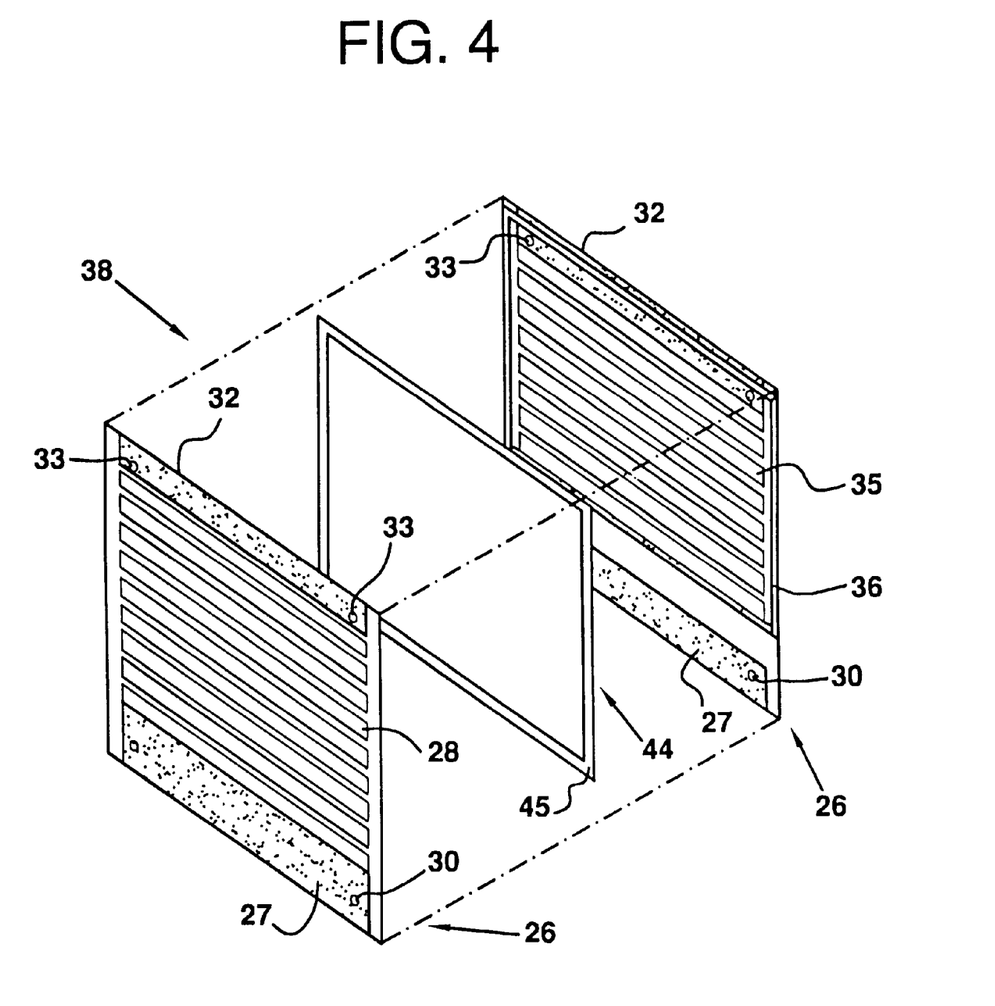
FIG. 4 shows a fuel cell assembly with a fuel manifold pack sandwiched between two of the fuel cell arrays used in the sealed fuel cell assembly embodiment.

FIG. 4 shows a fuel cell assembly 38 that is made up of two fuel cell arrays 26 and a porous fuel manifold 44. In this assembly, a porous fuel manifold 44 is sandwiched between the fuel side of two fuel cell arrays 26. This requires that the orientation of one of the arrays be flipped over horizontally so that the fuel side of both arrays face the porous fuel manifold 44. This sandwiched fuel cell assembly 38 leaves air electrodes 28 exposed on both sides. The porous fuel manifold 44 is sealed along the surface of its rim 45, using such techniques as ultrasonic thermal welding or an adhesive layer such as polyester epoxy. This assembly is like a bag that contains the fuel and exposes it over the fuel electrodes 35. The fuel is delivered and removed from the porous fuel manifold 44 through the fuel and bolt holes 33. A fuel gasket 36 seals the assembly between the fuel cell arrays 26 and porous fuel manifold 44, leaving the fuel electrodes 35 exposed to the fuel. Compression holes 30 and 33 are also used to make electrical connections for the positive air electrode contact 27 and the negative fuel electrode contact 32, respectively.

Figure 5A:
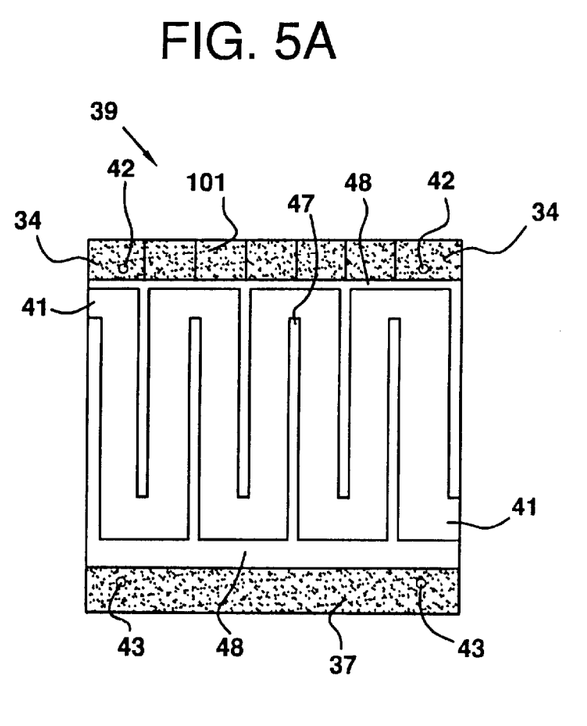
FIGS. 5A and 5B show a front and side view of the double-sided central air flow channel used in the sealed fuel cell assembly embodiment.
Figure 5B:
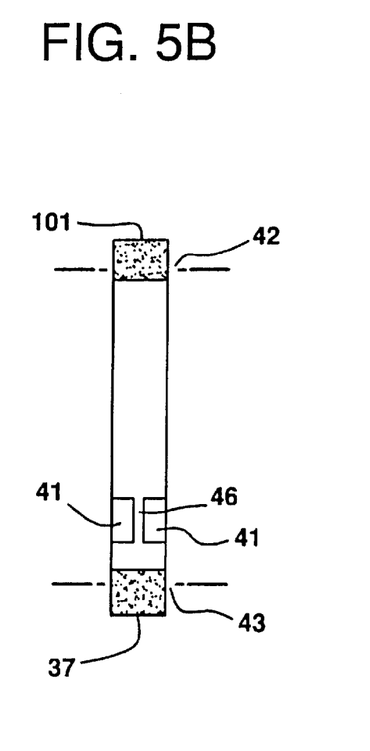

FIGS. 5A and 5B show a front and side view of the central air flow and support manifold 39 used in the fuel cell stack. As shown in FIG. 5B, this central air flow manifold 39 has two back-to-back air channels 41 separated by a center wall 46. This structure, constructed from a dielectric material, consists of flow channel walls 47 supported by side wall support material 48 and has a positive contact electrode 37 and negative contact electrode 101 located at the two ends. These contact electrodes 37 and 101 may be made from solid metal, such as aluminum or a sheet of conductive copper formed around the end of the dielectric channel support material 48. Air channels 41, located on both sides of the manifold 39 and separated by a wall 46, may be formed into a variety of patterns to provide a heat and moisture exchange mechanism over the air side surface of the fuel cell assemblies 26 (FIG. 4). For the serpentine pattern shown here, the air will continuously flow over the various portions of the fuel cell air electrodes 28. The fuel cell air electrodes 28 have a water wicking mat surface, as described in U.S. Pat. Nos. 4,673,624, 5,631,099, and 5,759,712, that permits condensed water to humidify and move laterally into the air stream moving in the air flow channel 41. The air flow channel 41 starts at one side of the central air flow manifold 39 and exits out the opposite side of the dielectric flow channel, as shown in FIG. 5A. Side wall material 48 borders the flow channels walls 47. This represents one possible configuration, although other arrangements that may produce better heat and water exchange by adjusting the channel wall thickness and spacing, as well as the flow pattern. Bolt holes 42 will accommodate the hollow fuel and stack compression bolts. Sealing around the fuel connections on the fuel cell array side may be accomplished with a rubber sealant gasket 36 when the fuel cell stack is assembled, although other methods may be used. In a similar manner, bolt holes 43 accommodate the air electrode compression bolts.

Figure 6A:
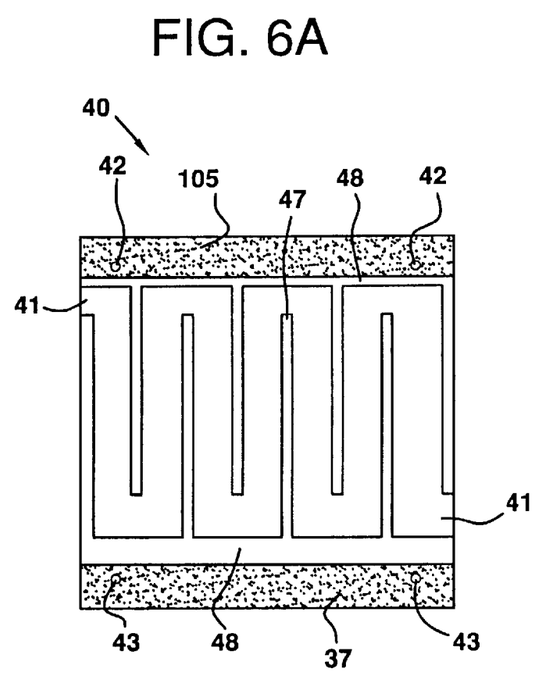
FIGS. 6A and 6B show a front and side view of a single-sided end-cap air flow channel used in both embodiments.
Figure 6B:
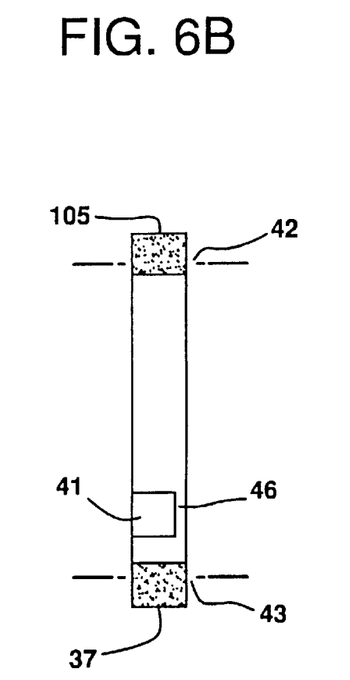

FIGS. 6A and 6B show a front and a side view of the end cap air flow and pressure support manifold 40 used in the fuel cell stack 100. The end cap air channel manifolds 40 are the same as the central air flow channels 39 except that they have the air flow channel 41 on only the inner side of the assembly, as shown in FIG. 6B, and as a result provide end caps for the fuel cell stack assembly 100.

Figure 7:
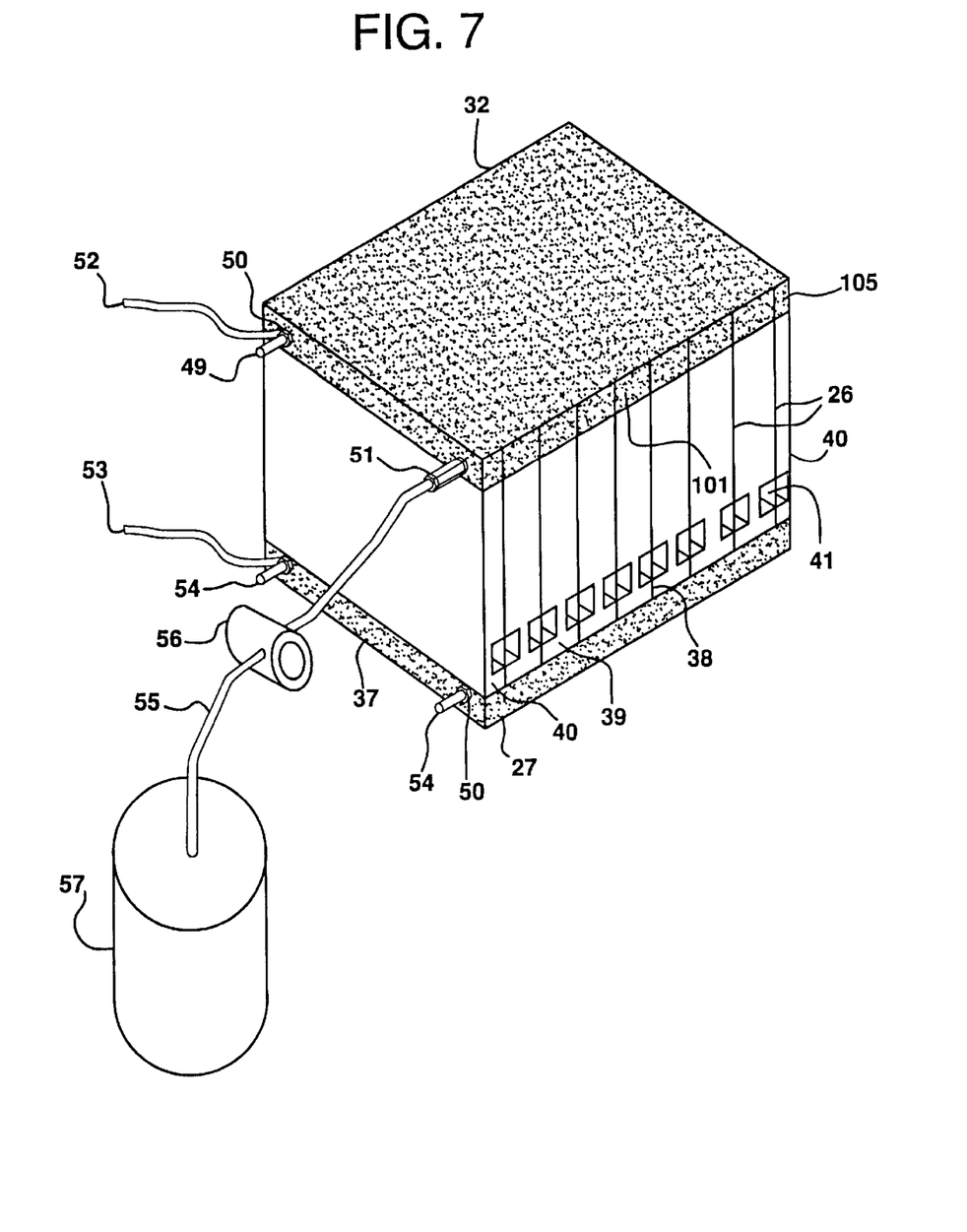
FIG. 7 shows a system level assembly for the sealed fuel cell stack embodiment.

An assembled system level fuel cell stack for this first embodiment of the patent is shown in FIG. 7. The system, as illustrated, is comprised of eight (8) fuel cell assemblies 26, seven (7) central air flow manifolds 39, two (2) end cap air manifolds 40, and other peripheral components discussed below. As shown, the fuel cell assembles 26 are compressed between the central air flow manifolds 39 with end cap manifold 40 included at each end of the stack. Hollow fuel bolts 49 and nuts 50 are used to pull the fuel contact electrodes 32 (on the fuel cells) and 101 (on the air flow manifolds) and 105 (on the end cap manifolds) together. A fuel line coupling 51 makes the connection to the hollow fuel bolts 49, as shown. The negative electrical contact is made by means of cable 52 attached to fuel bolt 49. In a like manner, solid compression bolts 54 are used to pull the air contact electrodes 27 (on the fuel cells) and 37 (on the air flow manifolds) together. The positive electrical contact is made by means of cable 53 attached to compression bolts 54 and nuts 50. Fuel is delivered to the fuel cell stack by means of a fuel line 55, through a fuel valve 56, from a fuel tank 57. The unused fuel exits though the hollow bolt 49 and can be, discarded, burned, or filtered and reused. Air flow channels 41 route the flow of air across the air electrodes of each fuel cell assembly. Air enters the fuel cell stack from one side and moves through the serpentine channels to exit on the opposite side of the stack. For safety purposes, electrical connections are made after the fuel connections are sealed off to avoid the possible presence of a destructive voltage in the vicinity of open fuel.

Figure 8:
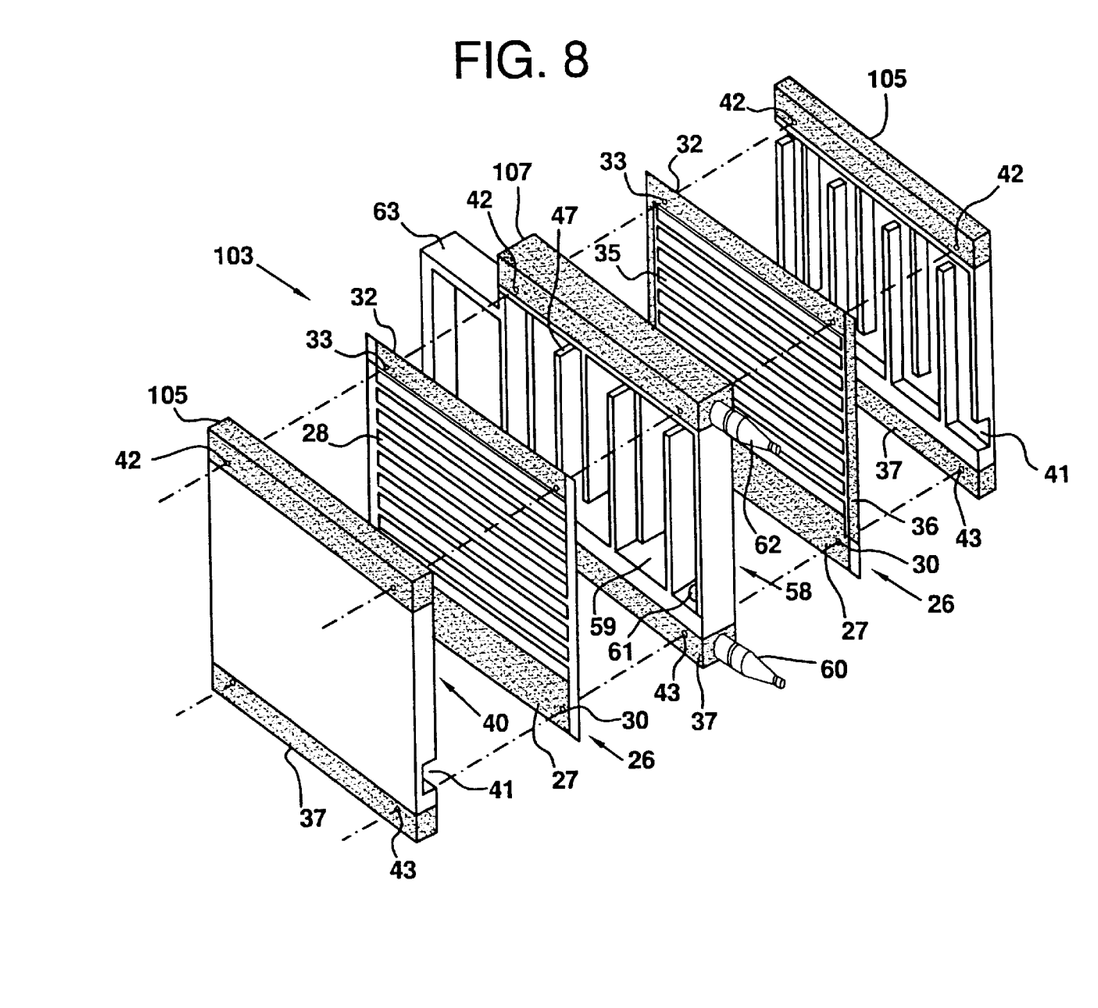
FIG. 8 shows an exploded view of the fuel cell stack for the modular assembly embodiment.

FIG. 8 shows an exploded view for a second alternate embodiment of a non-bipolar fuel cell modular configuration which can be used for applications with very large power requirements. The main difference here is that the fuel manifold 44 (FIG. 4) of the first embodiment, which is essentially a bag of fuel, has been replaced with a much larger serpentine fuel manifold 58 and in this approach the air and fuel manifolds 58 and 40, respectively, along with individual fuel cell arrays 26, forms a module 103 that slides into a common bus structure. Air flow channels 41 exist as before. This fuel distribution manifold 58 is made of the same material 47 but is thicker and has fuel flow channels 59 which are again arranged in a serpentine pattern. Fuel seal gasket 36 is used between the fuel cell array 26 and fuel manifold 58 to prevent fuel leakage. The fuel flows up from a fuel inlet connector 60, through fuel ports 61 into the fuel channel 59. The fuel inlet connector 60 is built into the positive contact electrode 37, while the fuel outlet connector 62 is built into the negative electrical contact electrode 107. The fuel electrodes 35 on the fuel cell array 26 are shown facing the fuel manifold 58 while the air electrodes 28 are shown facing the end cap air manifolds 40. The module 103 is drawn together with solid bolts 54 and nuts 50 through holes 42 and 33, and through holes 43 and 30. In this case, the bolts are only used for alignment and compression of the assembly and electrical contact, since the fuel is brought into the fuel manifold 58 through inlet connector 60 and exits through fuel outlet connector 62. This makes negative electrical contact through contact electrodes 107, 105 and 32 and positive electrical contact through contact electrodes 37 and 27. The fuel manifold 58 also has a built-in dielectric handle 63 used for inserting and removing the module 103 into or from the system assembly.

Figure 9:
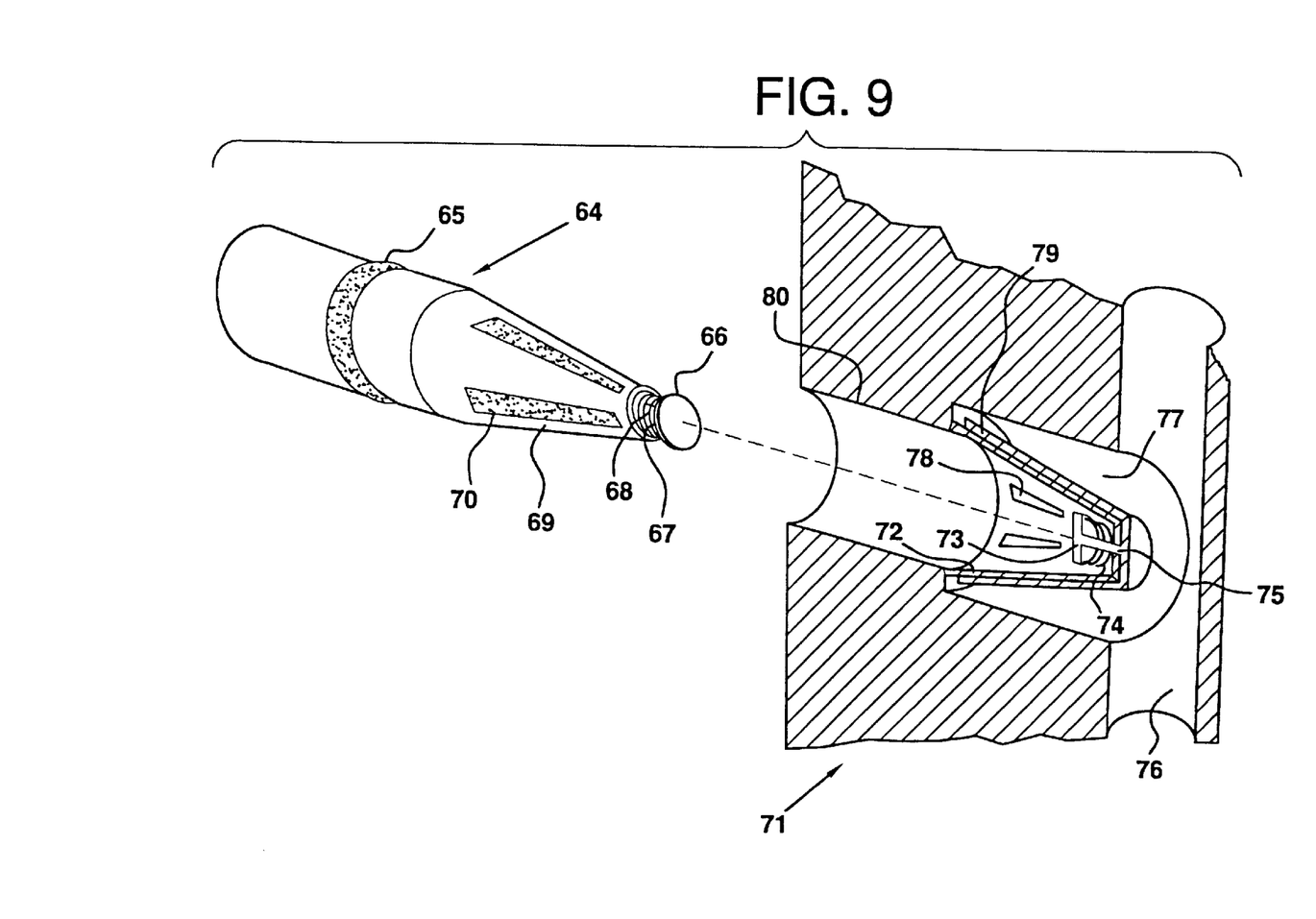
FIG. 9 illustrates a typical fuel valve used in the modular assembly embodiment.

FIG. 9 shows an exploded view of the fuel valve connector 64 along with a cross-sectional view of the mating fuel valve channel block 71 in the common bus structure. The fuel couplings are similar to the air inlet valve on car tires where a valve opens after the fuel cell module has made a gas tight seal. This connection is designed to have an o-ring seal 65 which makes a seal as it slides into the mating hole 80 of fuel supply channel block 71. Two push buttons 66 and 73 make contact and open the valve inner seal cone 69 and the outer seal cone 79. The cones 69 and 79 are held shut by air pressure and springs 67 and 74 around the sliding shafts 68 and 75. Gas flows though the apertures 70 and 78, and the aperture cage 72 when the valves are seated. Within the fuel supply channel block 71 there are also channels 76 included to distribute fuel to the valve flow channels 77.

Figure 10:
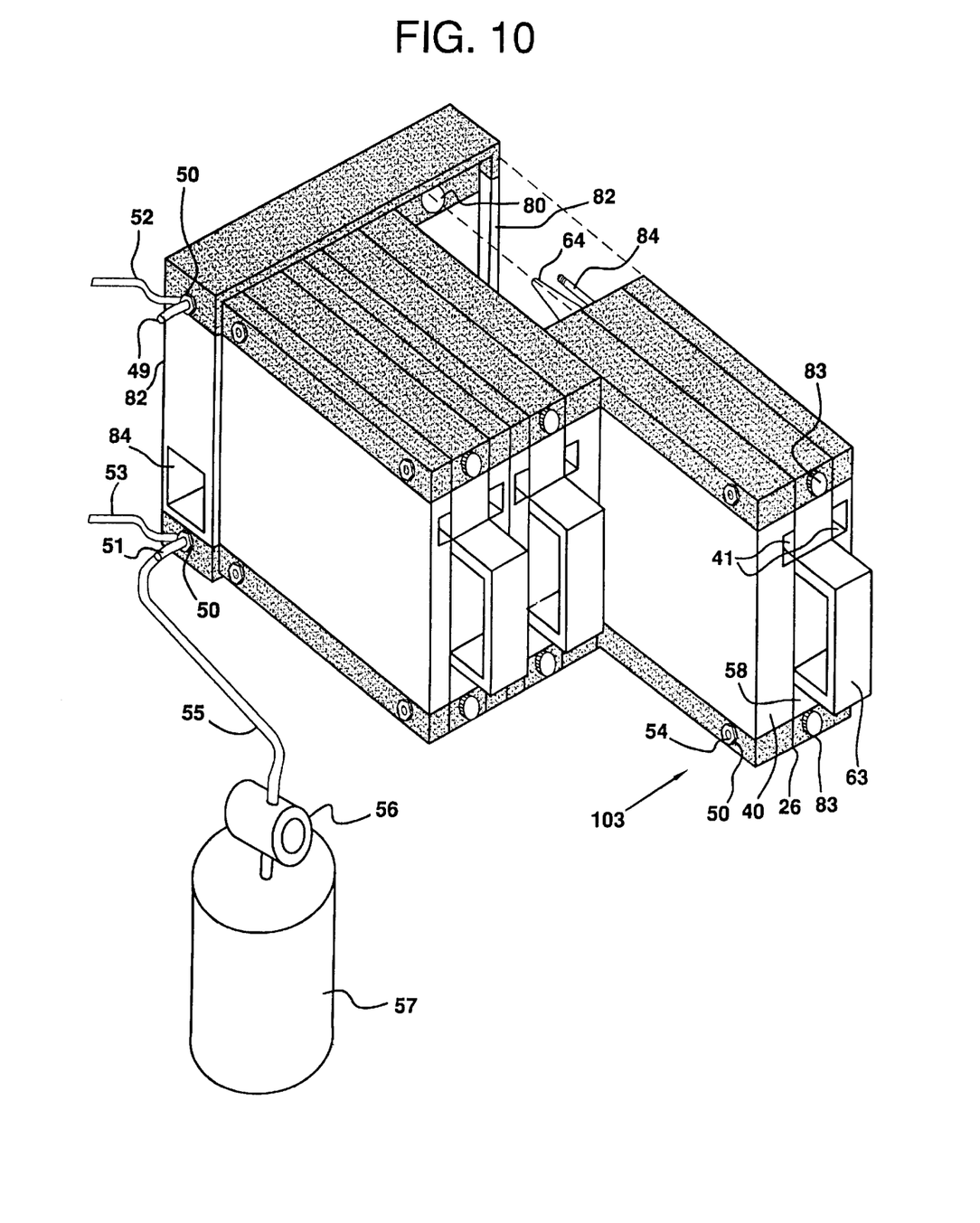
FIG. 10 is a perspective view of a system level assembly for the modular fuel cell stack embodiment.
Figure 11:
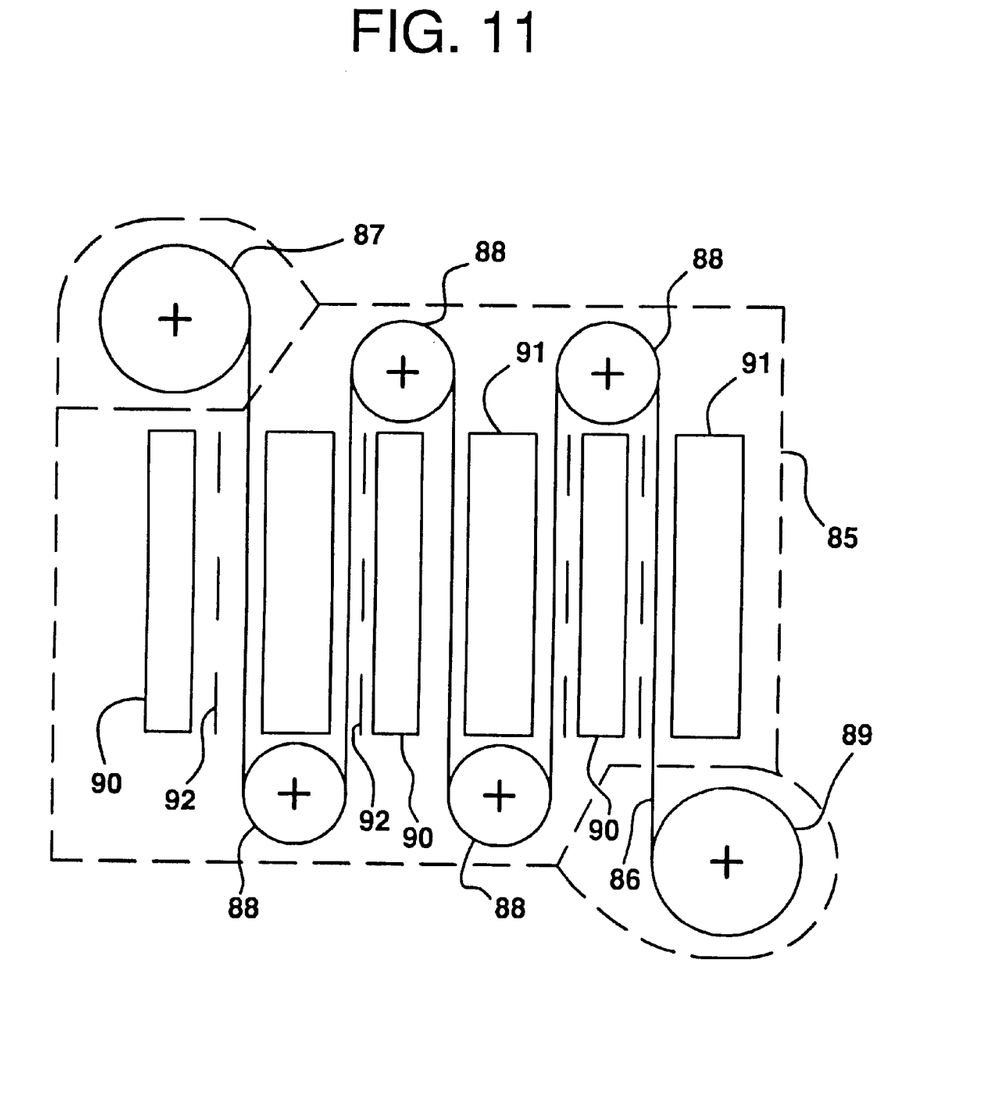
FIG. 11 is a diagram of the reel-to-reel manufacturing approach for the non-bipolar fuel cells.

FIG. 10 shows a system level assembly of the fuel cell slide out modules 103 of this alternative embodiment. Each module 103, which consists of two fuel cell arrays 26, two air end cap manifolds 40, and a fuel manifold 58, may be installed in the channel block 82 by inserting valve connector 64 into mating hole 80 and secured in place with screws 83. Air flow to all the modules enters the channel block 82 through port 84 and comes out of the individual modules 103 through their air ports 41. The shaded areas of this figure indicate positive and negative electrical conductive regions along the bottom and top of the modules 103, respectively, as discussed in FIG. 8. Electrical connections within each module 103 are made by compressing these conductive areas together with bolts 54 and nuts 50, as shown. Electrical connection between the modules 103 and the channel block 82 are made by spring loaded prongs 84, which are located at both the top and bottom of the modules or by some comparable method. Electrical access to the system level assembly is made through wires 52 and 53 which connect to the assembly with hollow bolts 49 and 51 and nuts 50. The fuel and oxidizer connections are made through double sealing connections by means of the fuel valve connector 64, discussed earlier, which seals both the fuel line 55 and fuel cell modules 103 when they are separated. These connections only open when they are secured together. As before, fuel is delivered to the fuel cell stack by means of a fuel line 55 through a fuel valve 56, from an external fuel tank 57. The fuel enters through hollow bolt 51 with unused fuel exiting though the hollow bolt 49. The unique quick disconnect fuel and electrical features, along with the electrical diodes (not shown) that are built into each fuel cell array 26, allow the modules 103 to be removed and added to a running assembly of modules, by means of handle 63, without disturbing the system. A critical component in this invention is a fuel cell that is formed on a plastic sheet, such as but not limited to the fuel cells described in U.S. Pat. Nos. 5,631,099, 4,673,624 and 5,759,712. The production technique enables the fuel cells to be produced in a reel-to-reel manufacturing method, similar to printing press processes, as shown in FIG. 11. The production is envisioned as taking place in a vacuum system 85 in which the metal electrodes and catalysts are deposited onto a reeled porous plastic web 86. In this manufacturing process, the porous plastic web 86 is fed from a source reel 87, into the vacuum system 85, over a number of position and tension reels 88, and on to a take-up reel 89. Sputter material sources 90 and heat sinks 91 are located at strategic positions along the porous plastic 86 path within the vacuum system 85, where sputter masks 92 are used to deposit the appropriate patterns on the fuel cell arrays 26 (not shown). The electrolytes could also be deposited by means of a reeled vacuum deposition system or dip tank. The individual fuel cell devices can be cut off the rolls of fuel cells and assembled. The edge seals are expected to be heat sealed, with the cutting operation and heat seal operation envisioned as one and the same. A major advantage of this approach is that the production and disposal manufacturing processes do not present toxic waste by-products.

Both embodiments of this patent lend themselves to monitoring and diagnostic features which can help keep these energy sources safe during operation. The simplest of these devices is a diode included at the electrical output of each fuel cell array 26. The diode prevents current from flowing backwards though a fuel cell in the event an internal short occurs. Fuses or current limiting electronics may also be used to prevent reverse current flow though an array. Monitoring devices may also be used to detect a significant fuel leak in a fuel cell module and shut down the module. To accomplish this, fuel valves 56 are electrically linked to the fuel cell outputs throughout the system. In the event of a fuel leak, the current output of the fuel cell module will tend to drop due to the mixing of fuel and oxidizer in the manifolds, significantly reducing the performance of the cell. If there is a large drop in current flowing in the solenoid of one of the valves, due to a fuel leak, the solenoid will drop out, closing the valve and shutting off the flow of fuel to that fuel cell. A simple light, visible on the outside of each module, may also provide a simple indicator of fuel cell operation. In a more sophisticated approach, electronic diagnostic circuits in the form of application specific integrated circuits may be added in the current conductors at the output of each fuel cell to monitor the cell current and voltage levels. These integrated circuits shut down a failing cell to prevent a catastrophic failure. In larger systems, the readout from these diagnostic circuits may be logged on a computer where the performance of each individual fuel cell, as well as the overall system performance, may be monitored and controlled at all times. Any number of more complex diagnostics concepts may be used, including, but not limited to, high frequency communications and/or non-contact radio communications through the bus output. Another feature that may be added is a "fail safe" device that is incorporated into the modules to have the current output of the fuel cells go through a solenoid valve that opens the reactant connections, such that the modules may only be turned on by "starting" them manually with an external electrical input, much like the pilot light on stoves and furnaces. On the other hand, they close automatically if the electrical output of a cell dropped below a threshold value. Along with diagnostics and safety features, additional features may include such items as the cleaning of the fuel cells by independently electrically pulsing the fuel cells. A more sophisticated valve arrangement may be added so that gas connections other than the reactant are selected to purge the cell and/or "bleed" the fuel lines.

While this invention has been described with reference to specific embodiments, modifications and variations of the invention may be constructed without departing from the scope of the invention, which fall is defined in the following claims.

I claim:

1. A non-bipolar fuel cell stack apparatus for delivering power comprising fuel cell assemblies each further comprising two fuel cell arrays with fuel electrode sides facing inward and air sides facing outward, mounted in a stack and electrically connected in parallel to positive and negative electrical connections, central air manifolds mounted between the fuel cell assemblies and end cap air manifolds mounted on ends of the stack and coupled by central air manifolds to the air sides of said fuel cell assemblies on the ends of the stack, the air manifolds having serpentine air flow channels from side-to-side of the assemblies in the stack, fuel manifolds coupled to the fuel sides of said fuel cell arrays in the fuel cell assemblies, hollow fuel lines and compression bolts connected to the fuel manifolds and extending through the air manifolds and fuel cell assemblies, an external fuel tank, an external fuel control valve, an external fuel line coupling said fuel tank and said fuel control valve, a fuel input coupler connected to the hollow fuel lines, a second external fuel line coupling said fuel control valve and said fuel input coupler.

2. The apparatus of claim 1, wherein each fuel cell assembly further comprises two individual fuel cell arrays having air sides and fuel electrode sides connected back-to-back, a fuel manifold between the fuel electrode sides of said fuel cell arrays, a fuel side fuel gasket between each of said fuel cell arrays and said fuel manifold, a compression seal between each of said fuel cell arrays and said fuel manifold, and electrical connections further comprising positive and negative electrical contact connections between said fuel cell arrays and said air manifolds.

3. The apparatus of claim 2, wherein each fuel cell array further comprises a porous plastic substrate, air side electrodes, fuel side electrodes, within the fuel side fuel gasket, each said air manifold covered with a water retaining and flow surface, and having a positive electrical contact electrode, a negative electrical contact electrode, a built-in protection diode connected to one of the electrodes, and mounting and compression holes.

4. The apparatus of claim 2, wherein each fuel manifold comprises a porous plastic fuel bag with edges, said porous plastic bag being sealed around the edges.

5. The apparatus of claim 1, wherein each central air manifold comprises a dielectric support structure, dual dielectric serpentine air channels on two sides of the structure, a conductive positive electrical contact electrode, a conductive negative electrical contact electrode, and mounting and compression holes.

6. The apparatus of claim 1, wherein each end cap air manifold comprises a dielectric support structure, a dielectric serpentine air channel on one side of the structure, a conductive positive electrical contact electrode, a conductive negative electrical contact electrode, and mounting and compression holes.

7. The apparatus of claims 5, wherein dielectric serpentine air channels further comprise exit ports, and allow water to transfer laterally from the fuel cell arrays to said serpentine air channels, permit condensed water to humidify air in the said serpentine air channel, permit heat transfer to the exposed air in said serpentine air channel, and carry water and heat out of assembly through the exit ports.

8. The apparatus of claim 3, wherein each fuel cell array is produced using a reel-to-reel manufacturing technique comprising a substrate material source wheel and a substrate material take-up reel wherein substrate material transfers from a source reel to a take-up reel.

9. The apparatus of claim 8, wherein the manufacturing technique further comprises a web coating vacuum chamber wherein a porous plastic web substrate material transfers from a substrate material source reel to a substrate material take-up reel through a series of sputter material sources, a series of heat sinks, and sputter masks.

10. A non-bipolar fuel cell stack apparatus comprising fuel cell assemblies each further comprising two fuel cell arrays with fuel electrode sides facing inward and air sides facing outward mounted in a stack.

* * * * *